US008896733B2

(12) United States Patent
Solhusvik

(10) Patent No.: US 8,896,733 B2
(45) Date of Patent: Nov. 25, 2014

(54) IMAGING SYSTEM WITH AUTOMATIC CONVERSION GAIN SELECTION

(75) Inventor: Johannes Solhusvik, Haslum (NO)

(73) Assignee: Aptina Imaging Corporation, George Town (KY)

( * ) Notice: Subject to any disclaimer, the term of this patent is extended or adjusted under 35 U.S.C. 154(b) by 649 days.

(21) Appl. No.: 13/046,503

(22) Filed: Mar. 11, 2011

(65) Prior Publication Data

US 2012/0188427 A1   Jul. 26, 2012

Related U.S. Application Data

(60) Provisional application No. 61/435,055, filed on Jan. 21, 2011.

(51) Int. Cl.
*H04N 5/335* (2011.01)
*H04N 5/378* (2011.01)
*H04N 5/355* (2011.01)
*H04N 5/3745* (2011.01)
*H04N 9/64* (2006.01)

(52) U.S. Cl.
CPC ............ *H04N 5/3559* (2013.01); *H04N 5/378* (2013.01); *H04N 5/3745* (2013.01)
USPC ............ 348/294; 348/242; 348/255; 348/300

(58) Field of Classification Search
CPC . H04N 5/3532; H04N 5/3572; H04N 17/002; H04N 5/21; H04N 5/2226; H04N 5/2251; H04N 5/2254
USPC ......... 348/300, 296, 294, 242, 243, 245, 255, 348/E05.091
See application file for complete search history.

(56) References Cited

U.S. PATENT DOCUMENTS

| 7,999,620 | B2 * | 8/2011 | Kapusta | 330/296 |
|---|---|---|---|---|
| 2007/0023801 | A1 * | 2/2007 | Hynecek | 257/292 |
| 2007/0145447 | A1 * | 6/2007 | Lee et al. | 257/292 |
| 2009/0084943 | A1 * | 4/2009 | Solhusvik et al. | 250/214 AL |
| 2009/0256940 | A1 * | 10/2009 | Pahr | 348/308 |
| 2009/0272879 | A1 * | 11/2009 | Dai | 250/208.1 |
| 2010/0097371 | A1 | 4/2010 | Willassen | |
| 2010/0265371 | A1 * | 10/2010 | Vogel et al. | 348/294 |
| 2010/0282946 | A1 * | 11/2010 | Yin et al. | 250/214 A |
| 2011/0013046 | A1 * | 1/2011 | Hiyama | 348/222.1 |
| 2012/0153123 | A1 * | 6/2012 | Mao et al. | 250/208.1 |
| 2012/0162477 | A1 * | 6/2012 | Tanaka | 348/231.99 |

FOREIGN PATENT DOCUMENTS

WO    2004112376    12/2004

* cited by examiner

*Primary Examiner* — Hung Lam
(74) *Attorney, Agent, or Firm* — Treyz Law Group; Jason Tsai

(57) ABSTRACT

An image sensor may include an image pixel array. The image sensor may be provided with automatic conversion gain selection on a pixel-by-pixel basis to produce a high-dynamic-range image. Each image pixel may include a capacitor and a conversion gain transistor coupled in series between a power supply line and a floating diffusion node. The conversion gain transistor may be coupled to a control line through a gating transistor. The gating transistor may have a gate connected to a row select line. The image pixel may have an output line that is coupled to a column amplifier and a comparator. The column amplifier may generate a difference voltage based on reset and image signals. The comparator may compare the difference voltage with a predetermined threshold to determine whether to place the selected pixel in a high or low conversion gain mode.

10 Claims, 4 Drawing Sheets

IMAGING SYSTEM WITH AUTOMATIC CONVERSION GAIN SELECTION

This application claims the benefit of provisional patent application No. 61/435,055, filed Jan. 21, 2011, which is hereby incorporated by reference herein in its entirety.

BACKGROUND

The present invention relates to image sensors and, more particularly, to image sensors that are used to produce high-dynamic-range images.

Image sensors are commonly used in electronic devices such as cellular telephones, cameras, and computers to capture images. In a typical arrangement, an electronic device is provided with a single image sensor and a single corresponding lens. Some electronic devices use arrays of image sensors and corresponding lenses to gather image data. In certain applications, such as when acquiring still or video images of a scene with a large range of light intensities, it may be desirable to capture high-dynamic-range images. In high-dynamic-range images, highlight and shadow detail can be retained that would otherwise be lost in a conventional image.

It would be desirable to be able to capture high-dynamic-range images with electronic devices containing image sensors.

DETAILED DESCRIPTION

Digital camera modules are widely used in electronic devices such as digital cameras, computers, cellular telephones, and other electronic devices. These electronic devices may include image sensors that gather incoming light to capture an image. The image sensors may include arrays of image pixels. The pixels in the image sensors may include photosensitive elements such as photodiodes that convert the incoming light into digital data. Image sensors may have any number of pixels (e.g., hundreds or thousands or more). A typical image sensor may, for example, have hundreds of thousands or millions of pixels (e.g., megapixels).

The use of an image sensor with gain selection circuitry produces images with enhanced dynamic range. In particular, each pixel may generate a corresponding output value using a selected gain setting. The selected gain setting may depend on the amount of light captured by the pixel during an exposure (i.e., a period of time inversely proportion to shutter speed).

For example, consider a scenario in which an image sensor containing a first set of image pixels and a second set of image pixels is used to capture an image. The first and second sets of image pixels may be exposed to incoming light for a given period of time. The first set of image pixels may capture a portion of the image that is bright, whereas the second set of image pixels may capture a portion of the image that is dark. The gain selection circuitry may detect this difference, thereby configuring the first set of image pixels to generate image data using a low gain setting and configuring the second set of image pixels to generate image data using a high gain setting. Generating a complete image using this approach (e.g., by combining output data generated using the first and second sets of image pixels with respective gain settings) enhances the dynamic range of the captured image. If the gain selection circuitry were not used, the captured image may suffer from blown out highlights or overexposed shadows.

Figure 1:
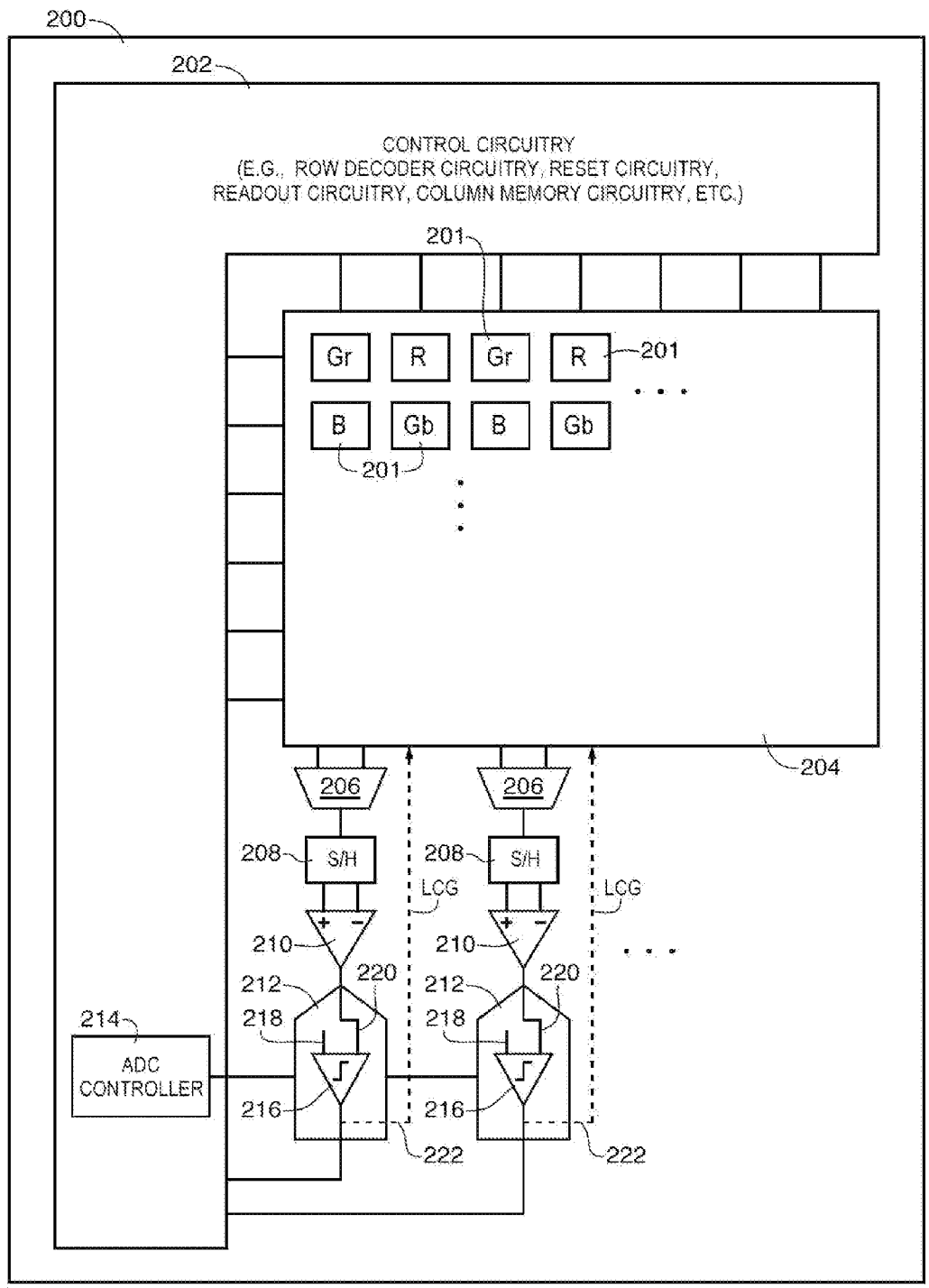
FIG. 1 is a diagram of an image sensor that contains an image pixel array in accordance with an embodiment of the present invention.

One way of enhancing image sensor dynamic range is to perform automatic conversion gain selection (ACGS) on a pixel-by-pixel basis. FIG. 1 is a diagram of an illustrative image sensor that includes automatic conversion gain selection circuitry. As shown in FIG. 1, image sensor 200 includes image pixel array 204, control circuitry 202, and associated column circuitry (e.g., automatic conversion gain selection circuitry). Control circuitry 202 may include row decoder and readout circuitry, reset circuitry, column memory circuitry, and other circuitry for controlling transfer and reset operations, row selection (e.g., readout), conversion gain, and column amplifier gain associated with each image pixel 201 in pixel array 204.

Image pixel array 204 may include image pixels 201 arranged in groups of four pixels 201 (e.g., in a regular two-by-two configuration). For example, each group of pixels may include a red pixel R located in a first row, a green pixel Gr located in the first row, a blue pixel B located in a second row that is adjacent to the first row, and a green pixel Gb located in the second row.

A color filter array may be formed over array 204. A green color filter (e.g., a filter that only passes through green light) may be formed over pixels Gr and Gb. A red color filter (e.g., a filter that only passes through red light) may be formed over pixels R, whereas a blue color filter (e.g., a filter that only passes through blue light) may be formed over pixels B. This pattern of Gr-R-Gb-B pixels may be replicated across array 204 to form an image pixel array with hundreds, thousands, or millions of pixels 201.

Each pair of adjacent columns may be coupled to associated column circuitry. For example, each pair of adjacent columns may be coupled to multiplexer 206. Multiplexer 206 may be configured to route to its output a selected one of the two output signals generated by the pair of pixels 201 in the selected row. For clarity, column circuitry that is used to receive the other output signal is not shown in FIG. 1.

Multiplexer 206 may have an output that is connected to sample-and-hold (S/H) circuit 208. Sample-and-hold circuit 208 may have first and second terminals that are respectively coupled to first and second inputs of column amplifier 210. S/H circuit 208 may be used to sample a first signal and to hold the first sampled signal on its first terminal. S/H circuit 208 may then sample a second signal and hold the second sampled signal on its second terminal. Amplifier 210 may receive the first and second sampled signals as differential input signals and output a corresponding signal based on the voltage difference between the first and second sampled signals. As an example, the signal at the output of amplifier 210 may be amplified by a gain of one (if amplifier 210 is in a low gain mode) or may be amplified by a gain of two, four, or eight (if amplifier 210 is in high gain mode). If desired, amplifier 210 may be configured to generate an attenuated version of the voltage difference.

The output of amplifier 210 may be coupled to analog-to-digital converter (ADC) 212. Converter 212 in each column may be controlled using ADC controller 214 (may be formed as part of circuitry 202). Converter 212 may serve to convert the amplified/attenuated output signal into a digital signal. The converted digital signal may be fed to circuitry 202 for further storage and processing.

Converter 212 may include comparator circuit 216. Comparator 216 may have a first input 220 that is coupled to the output of column amplifier 210 and a second input 212 that receives a predetermined threshold voltage. If the voltage on input 220 is greater than the threshold voltage, comparator 216 will output a high voltage signal (e.g., a logic "1"). If the voltage on input 220 is less than the threshold voltage, comparator 216 will output a low voltage signal (e.g., a logic "0"). The signal generated at the output of comparator 216 (e.g., low conversion gain signal LCG) may be fed back over path 222 (sometimes referred to as a conversion gain control line) to each pixel 201 in the associated column. Signal LCG may serve to provide automatic conversion gain selection (ACGS) on a per pixel basis.

Figure 2:
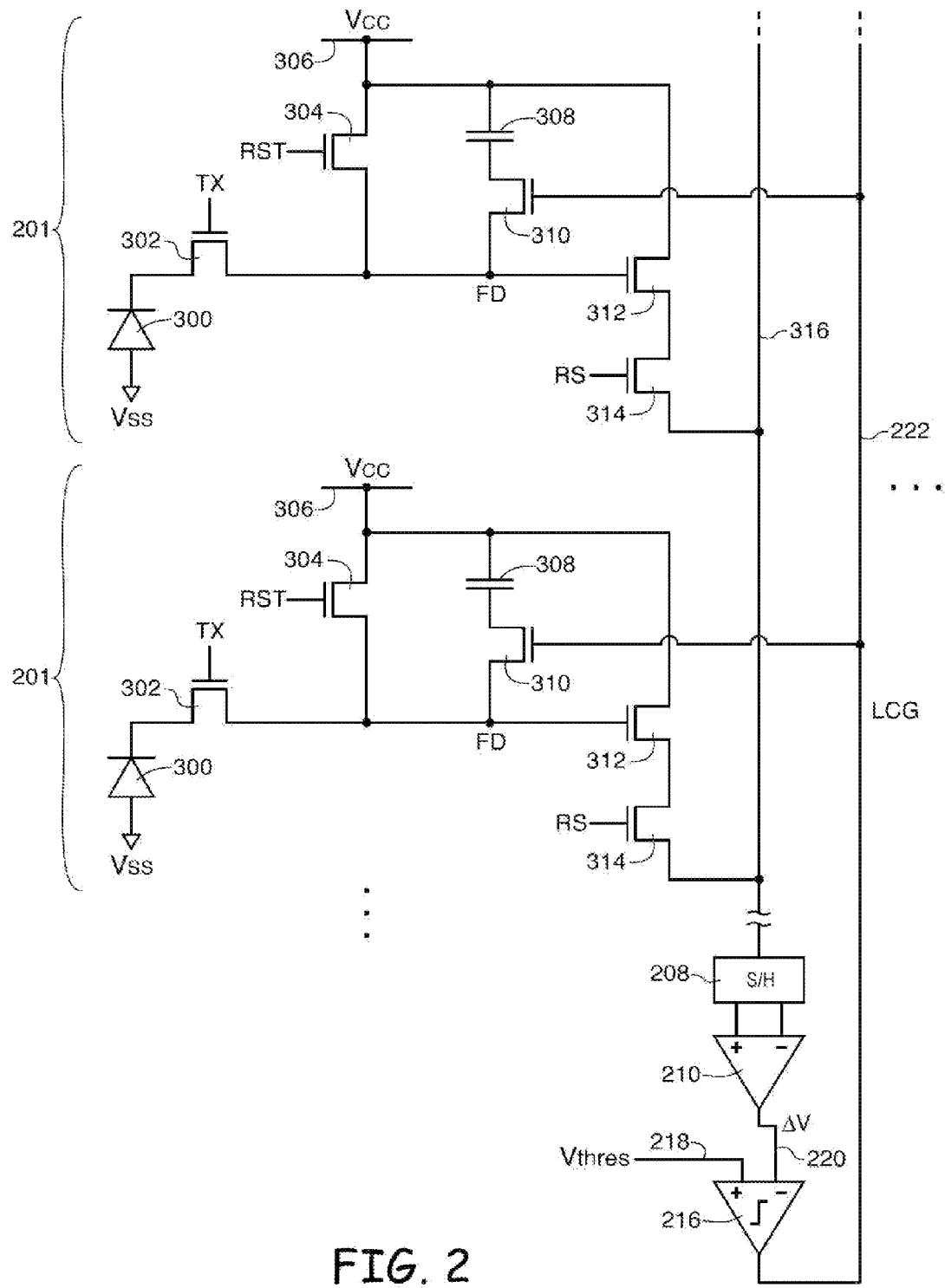
FIGS. 2 and 3 are circuit diagrams showing a column of illustrative image pixels coupled to automatic conversion gain selection circuitry associated with that column in accordance with an embodiment of the present invention.

One suitable circuit implementation of pixels 201 is shown in FIG. 2. As illustrated in FIG. 2, each column of pixels may be coupled to associated column circuitry (e.g., sample/hold circuit 208, column amplifier 210, comparator 216, etc.). Multiplexer 206 is omitted for clarity.

Pixel 201 may include photosensitive element (e.g., a photodiode or other light gathering element) 300 coupled to a floating diffusion node FD through transfer gate 302. Transfer gate 302 may have a gate terminal that is controlled by signal TX. Reset transistor 304 may be coupled between positive power supply line 306 (e.g., a positive power supply line on which positive power supply voltage Vcc is provided) and node FD. Reset transistor 304 may have a gate terminal that is controlled using signal RST.

Source follower transistor 312 and row select (read) transistor 314 may be coupled in series between power supply line 306 and column output line 316. Source follower transistor 312 may have a gate terminal that is coupled to node FD, whereas read transistor 314 may have a gate terminal that is controlled using row select signal RS. Pixels 201 located along the same row may receive a common row select signal RS, whereas pixels 201 located along the same column are coupled to respective row select lines. Only a selected one of row select transistors 314 is turned on in any given column during read operations.

Image pixel 201 may include capacitor 308 and transistor 310 coupled in series between positive power supply line 306 and floating diffusion node FD. Pixel 201 may be operable in first and second modes (e.g., in a high conversion gain mode and in a low conversion gain mode). If transistor 310 is disabled, pixel 201 is placed in the high conversion gain mode. If transistor 310 is enabled, pixel 201 is placed in the low conversion gain mode.

In general, pixel conversion gain is inversely proportional to the amount of loading capacitance at node FD. When transistor 310 is turned on, capacitor 308 is switched into use to load floating diffusion node with additional capacitance. This results in a lower conversion gain for pixel 201. When transistor 310 is turned off, the additional loading of capacitor 308 is removed and pixel 201 reverts to provide higher pixel conversion gain.

Column output line 316 may be coupled to sample/hold circuit 208. Following a reset operation (e.g., in response to pulsing RST and RS), circuit 208 may be used to sample a corresponding reset signal Vrst from the selected image pixel and to hold Vrst at its first output terminal. Following a charge transfer operation (e.g., in response to pulsing TX), circuit 208 may be used to sample a corresponding image signal Vsig from the selected pixel and to hold Vsig at its second output terminal.

Column amplifier 210 may include first and second inputs. The first (positive) input of amplifier 210 may be coupled to the first output terminal of circuit 208, whereas the second (negative) input of amplifier 210 may be coupled to the second output terminal of circuit 208. Column amplifier 210 may be used to generate at its output a signal that is proportional to difference ΔV between signal Vrst received at its first input and signal Vsig received at its second input (e.g., the output signal generated using amplifier 210 may be proportional to Vrst subtracted by Vsig). If desired, column amplifier 210 may be used to provide configurable gain for ΔV by adjusting a global control signal Comparator 216 may include a first input and a second input. The first input of comparator 216 may be coupled to the output of column amplifier 210 to receive signal ΔV, whereas the second input of comparator 216 may be coupled to line 218 to receive a predetermined voltage signal Vthres. Signal Vthres may be approximately equal to a maximum voltage level that can be decoded using ADC 212. For example, if the maximum voltage level that can be decoded by ADC 212 is 1.0 V, Vthres will be set to 1.0 V.

Comparator 216 may generate low conversion gain signal LCG at its output. If signal ΔV (e.g., Vrst minus Vsig) is less than signal Vthres, comparator 216 will drive signal LCG low. If signal ΔV is greater than signal Vthres, comparator 216 will drive signal LCG high. Signal LCG may be conveyed over column conversion gain control line 222 to each pixel 201 in that column.

For example, the gate of transistor 310 in each pixel 201 in the associated column may be controlled by signal LCG. Generating signal LCG in this way may provide automatic conversion gain selection (ACGS) on a per-pixel basis across the image sensor pixel array. Only the selected pixel (i.e., the pixel with row select signal RS asserted) is actually read out with the desired conversion gain and column amplifier gain. Row select signals RS associated with the unselected pixels are not assert, so the unselected pixels do not affect the readout operation.

Figure 3:
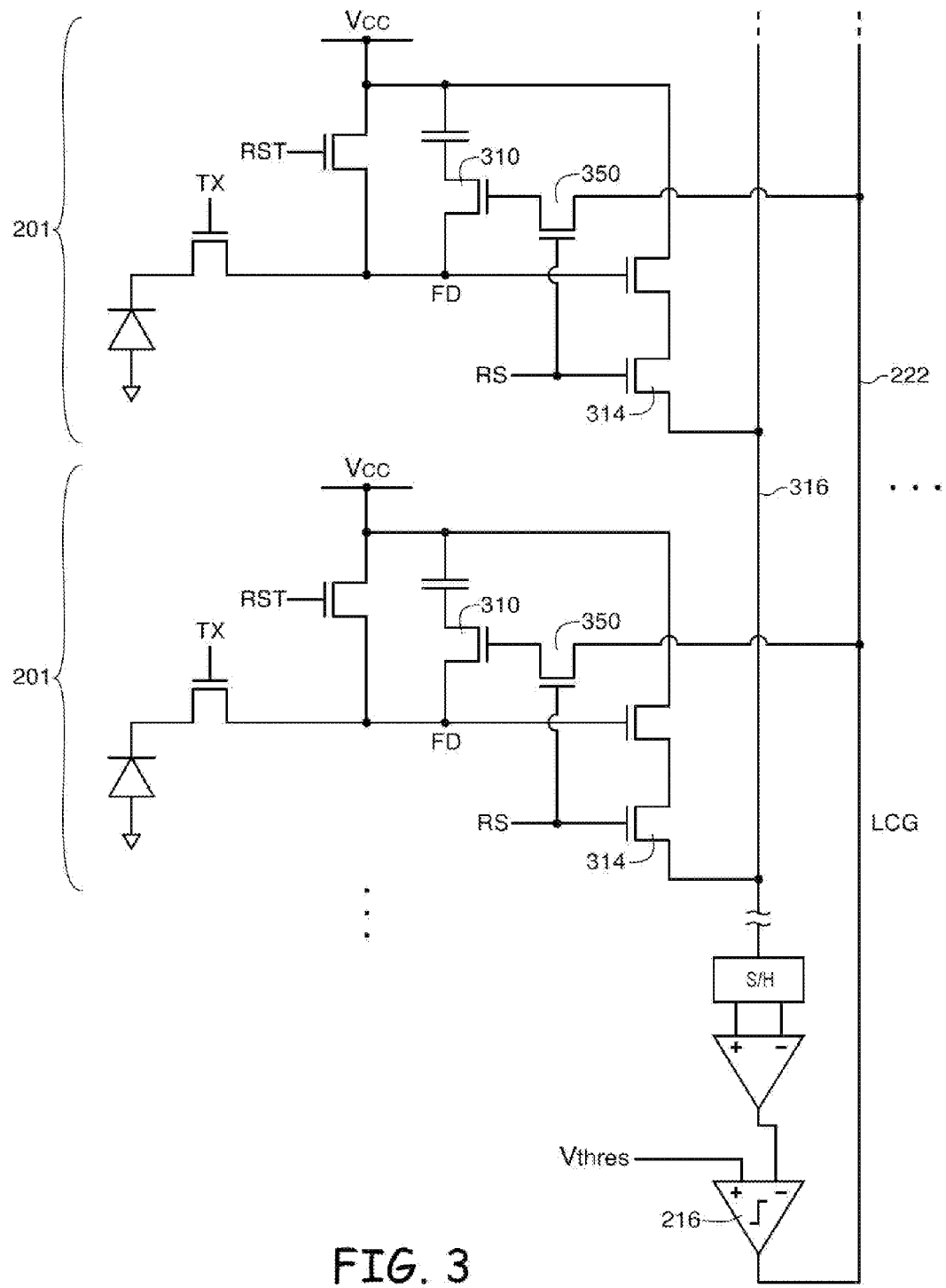

In another suitable arrangement, pixel 201 may include a switching circuit 350 interposed between transistor 310 and column line 222 (see, e.g., FIG. 3). Switch 350 may, as an example, be a transistor such as an n-channel transistor, a transmission gate, or other types of switches. As shown in FIG. 3, transistor 350 may have a first source-drain terminal that is connected to the gate of transistor 310, a gate terminal that is connected to the gate of transistor 314 (e.g., the gate of transistor 350 is controlled by signal RS), and a second source-drain terminal that is connected to line 222. Transistor 350 may serve as a gating transistor that routes signal LCG only to the selected pixel while blocking signal LCG from controlling the unselected pixels. Using switching circuit 350 in this way may reduce dynamic power consumed by comparator 216 when driving line 222 to high and low voltage levels (e.g., when asserting and deasserting signal LCG).

Figure 4:
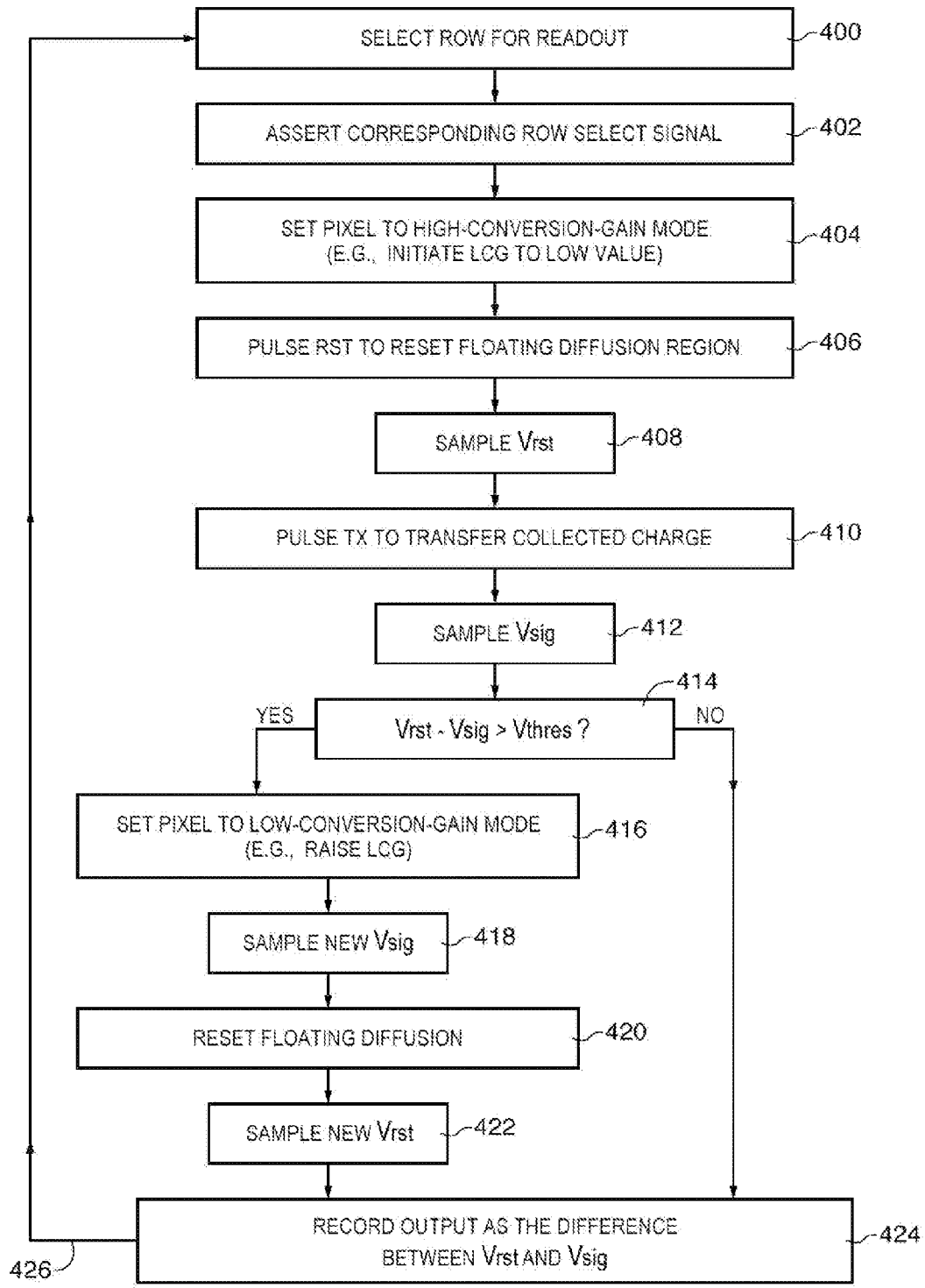
FIG. 4 is a flow chart of illustrative steps involved in operating the image sensor of FIG. 1 to produce high-dynamic-range images in accordance with an embodiment of the present invention.

FIG. 4 is a flow chart of illustrative steps involved in performing automatic conversion gain selection on a pixel-by-pixel basis in an image sensor. At step 400, a row may be selected for readout. At step 402, row select signal RS corresponding to the selected row may be asserted (while the row select signals associated with the unselected rows remain deasserted).

At step 404, selected pixel 201 may be placed in high conversion gain mode by initially setting signal LCG to a low value. At step 406, floating diffusion node FD of the selected pixel may be reset by pulsing signal RST. At step 408, a corresponding signal Vrst may be sampled using sample-and-hold circuit 208 (while RS is asserted to enable readout of the selected pixel).

At step 410, charge collected using photodiode 300 of the selected pixel may be transferred to floating diffusion node FD by pulsing signal TX. At step 412, a corresponding image signal Vsig may be sampled using sample-and-hold circuit 208 (while RS is asserted to enable readout of the selected pixel).

At step 414, comparator circuit 216 may be used to determine whether the difference between Vrst and Vsig (i.e., Vrst minus Vsig) is greater than predetermined threshold Vthres (e.g., a maximum voltage level that can be decoded by ADC 212). If the voltage difference is less than the predetermined threshold level, that voltage difference is stored as the captured image data (step 424).

If the voltage difference is greater than the predetermined threshold level, the selected pixel may be placed in low conversion gain mode by setting signal LCG to a high voltage value (step 416). At step 418, a new image signal Vsig may be sampled using circuit 208 (while RS is asserted). At step 420, floating diffusion node FD of the selected pixel may be reset by pulsing signal RST. At step 422, a new reset signal Vrst may be sampled using circuit 208 (while RS is asserted). At step 424, the voltage difference generated based on the new reset signal Vrst and the new image signal Vsig may be stored as the captured image data (step 424). If there are additional pixels to be read in that column, processing may loop back to step 400 to read out another image pixel (as indicated by path 426).

Various embodiments have been described illustrating electronic devices such as portable electronic devices with camera modules. A camera module may have at least one image sensor that is used to capture an image. The image sensor may contain an image pixel array. Automatic conversion gain selection may be provided on a per-pixel basis to enhance the dynamic range of the captured image.

Each image sensor pixel may include a photodiode for sensing the intensity of incoming light during an exposure. The photodiode may be coupled to a floating diffusion node through a transfer gate. A reset transistor may be coupled between the floating diffusion node and a positive power supply line (e.g., a power supply line on which a positive power supply voltage is provided). A source follower transistor and a row select transistor may be coupled in series between the positive power supply line and an output line. The source follower transistor may have a gate terminal connected to the floating diffusion node, whereas the row select transistor may have a gate terminal connected to a row select line.

Each image sensor pixel may also include a conversion gain circuit. The conversion gain circuit may include a capacitor and a first transistor coupled in series between the positive power supply line and the floating diffusion node. The first transistor may have a gate terminal that is coupled to a conversion gain column control line through a second transistor (sometimes referred to as a gating transistor). The gating transistor may have a gate terminal that is connected to the row select line.

The output line may be coupled to a sample-and-hold circuit having first and second outputs. The sample-and-hold circuit may be used to sample a reset signal and hold the sampled reset signal at its first output. The sample-and-hold circuit may be used to sample an image signal and hold the sampled image signal at its second output.

The first the second outputs of the sample-and-hold circuit may be coupled to first and second inputs of a column amplifier, respectively. The column amplifier may receive the sampled reset signal and the sampled image signal and generate a corresponding difference voltage (e.g., by subtracting the sampled image signal from the sampled reset signal). The column amplifier may be configured to amplify the difference voltage using a desired user-selected global gain setting (e.g., by amplifying the difference voltage using a gain of one, a gain of two, a gain of four, a gain of eight, etc.).

The column amplifier may have an output that is coupled to a comparator. The comparator may have first and second inputs. In particular, the output of the column amplifier is connected to the first input of the comparator. The second input of the comparator may receive a predetermined threshold voltage level. If the difference voltage is less than the predetermined threshold voltage, the comparator will deassert a low conversion gain signal (e.g., drive the low conversion gain signal towards ground). If the difference voltage is greater than the predetermined threshold voltage, the comparator will assert the low conversion gain signal (e.g., raise the low conversion gain signal). The low conversion gain signal may be supplied on the conversion gain column control line to place the selected pixel in a high conversion gain mode (if the low conversion gain signal is low) and in a low conversion gain mode (if the low conversion gain signal is high). Circuit 208, 210, 216, and the conversion gain circuit (e.g., capacitor 308 and transistors 310 and 350) may therefore be collectively referred to as automatic conversion gain selection circuitry. Providing automatic conversion gain selection in this way may enhance the dynamic range of the captured image.

The foregoing is merely illustrative of the principles of this invention which can be practiced in other embodiments.

What is claimed is:

1. An image sensor comprising:
 a power supply line;
 a first image pixel having a first floating diffusion node and a first conversion gain circuit, wherein the first conversion gain circuit is coupled between the power supply line and the first floating diffusion node and wherein the first conversion gain circuit is configured to provide a first conversion gain for the first image pixel;
 a second image pixel having a second floating diffusion node and a second conversion gain circuit, wherein the second conversion gain circuit is coupled between the power supply line and the second floating diffusion node, wherein the second conversion gain circuit is configured to provide a second conversion gain for the second image pixel, and wherein the second conversion gain is different than the first conversion gain;
 a conversion gain control line;
 a first switch coupled between the first conversion gain circuit and the conversion gain control line; and
 a second switch coupled between the second conversion gain circuit and the conversion gain control line, wherein the first and second switches are controlled by different signals.

2. The image sensor defined in claim 1, further comprising:
 a first row select line, wherein the first switch is controlled using signals provided on the first row select line; and
 a second row select line, wherein the second switch is controlled using signals provided on the second row select line.

3. The image sensor defined in claim 1, wherein the first and second conversion gain circuits each comprise a capacitor and a transistor coupled in series between the power supply line and a respective one of the first and second floating diffusion nodes.

4. An image sensor comprising:
a plurality of image pixels each of which is operable in a high conversion gain mode and a low conversion gain mode; and
column circuitry associated with the plurality of image pixels, wherein the column circuitry generates a control signal that configures at least one of the plurality of image pixels to operate in a selected one of the high and low conversion gain modes, wherein the column circuitry includes an amplifier having a first input that receives a first signal from a selected image pixel in the plurality of image pixels, a second input that receives a second signal from the selected image pixel, and an output on which a corresponding difference voltage that is proportional to the difference between the first and second signals is generated, wherein the column circuitry further includes a comparator having a first input that receives the difference voltage from the amplifier and a second input that receives a predetermined threshold voltage, and wherein the comparator has an output that is coupled to each image pixel in the plurality of image pixels.

5. The image sensor defined in claim 4, wherein the comparator generates the control signal at its output, wherein the comparator deasserts the control signal when the voltage at its first input is less than the predetermined threshold voltage, and wherein the comparator asserts the control signal when the voltage at its first input is greater than the predetermined threshold voltage.

6. The image sensor defined in claim 4, wherein the amplifier is configured to provide a selected one of a low amplifier gain and a high amplifier gain.

7. The image sensor defined in 4, wherein each of the plurality of image pixels comprises a conversion gain circuit, wherein the conversion gain circuit associated with a given image pixel in the plurality of image pixels is disabled when the given image pixel is configured in the high conversion gain mode, and wherein the conversion gain circuit associated with the given image pixel is enabled when the given image pixel is configured in the low conversion gain mode.

8. A method of generating a high-dynamic-range image using a plurality of image pixels in an electronic device each of which is operable in a high conversion gain mode and a low conversion gain mode, the method comprising:
configuring a first portion of the plurality of image pixels in the high conversion gain mode by deasserting a control signal on a column control line to configure the first portion of the plurality of image pixels in the high conversion gain mode;
configuring a second portion of the plurality of image pixels in the low conversion gain mode by asserting the control signal on the column control line to the configure the second portion of the plurality of image pixels in the low conversion gain mode;
with an amplifier having first and second inputs, receiving the first signal at its first input from a selected one of the image pixels, receiving a second signal at its second input from the selected image pixel, and generating a corresponding difference voltage that is proportional to the difference between the first and second signals; and
with a comparator having first and second inputs, receiving the difference voltage at its first input and a predetermined threshold voltage at its second input.

9. The method defined in claim 8, further comprising:
with the comparator, deasserting the control signal when the difference voltage is less than the predetermined threshold voltage; and
with the comparator, asserting the control signal when the difference voltage is greater than the predetermined threshold voltage.

10. The method defined in claim 9, wherein each of the plurality of image pixels includes a conversion gain circuit and a gating transistor interposed between the column control line and the conversion gain circuit, the method further comprising:
with the gating transistor in the selected image pixels, passing the control signal to the selected image pixel to configure the image pixel in a selected one of the high conversion gain mode and low conversion gain mode; and
with the gating transistors associated with image pixels other than the selected image pixel, blocking the control signal from configuring the image pixels other than the selected image pixel.

* * * * *